United States Patent
Hansen

[11] Patent Number: 5,199,349
[45] Date of Patent: Apr. 6, 1993

[54] SKIMMER/SEPARATOR LADLE

[75] Inventor: Hans Hansen, Vejle, Denmark

[73] Assignee: Scanintra ApS, Vejle, Denmark

[21] Appl. No.: 905,827

[22] Filed: Jun. 26, 1992

[30] Foreign Application Priority Data

May 1, 1992 [DK] Denmark ............................ 0580/92

[51] Int. Cl.⁵ .......................................... A47J 43/28
[52] U.S. Cl. ................................. 99/495; 30/325;
99/646 LS; 210/470; 210/498; D7/691;
D7/692
[58] Field of Search ............... 99/495, 450, 496, 508,
99/499, 506, 646 R, 646 LS; 30/324–328;
210/470, 513, 514, 498, 238; 220/660; D7/691,
692, 667

[56] References Cited

U.S. PATENT DOCUMENTS

| D. 194,402 | 1/1963 | Schlessel | D7/691 |
|---|---|---|---|
| 387,236 | 8/1888 | Knowlton | 210/470 |
| 783,235 | 2/1905 | Argersinger | 210/470 |
| 1,057,269 | 3/1913 | Prestien | 210/470 |
| 1,470,521 | 10/1923 | Combest | 99/450 |
| 1,654,980 | 1/1928 | LeDuc | 30/326 |
| 2,572,524 | 10/1951 | Schmeiler | 30/325 |
| 2,853,779 | 9/1958 | Lordo . | |
| 4,524,517 | 6/1985 | Rupe . | |
| 4,825,551 | 5/1989 | Sherblom | 30/325 |
| 4,839,965 | 6/1989 | Levie . | |
| 4,942,811 | 7/1990 | Kuhn | 99/495 |
| 5,005,294 | 4/1991 | Roberts et al. . | |
| 5,072,538 | 12/1991 | Hendricks et al. | 210/470 |
| 5,084,177 | 1/1992 | Keene | 99/495 |

FOREIGN PATENT DOCUMENTS

| 648 | 4/1973 | Denmark . |
|---|---|---|
| 789 | 2/1974 | Denmark . |
| 655 | 1/1975 | Denmark . |
| 727 | 2/1977 | Denmark . |
| 733 | 12/1979 | Denmark . |
| 197 | 3/1980 | Denmark . |
| 264 | 3/1983 | Denmark . |
| 0202 | 3/1986 | Denmark . |
| 955 | 4/1988 | Denmark . |
| 1178 | 2/1990 | Denmark . |
| 0673 | 12/1991 | Denmark . |
| 0316499 | 5/1989 | European Pat. Off. . |
| 2208318 | 6/1973 | Fed. Rep. of Germany . |
| 1013301 | 7/1952 | France . |
| 1574164 | 7/1969 | France . |
| 2565807 | 12/1985 | France ................. 99/495 |

Primary Examiner—Timothy F. Simone
Attorney, Agent, or Firm—Thomas R. Vigil; James P. Hanrath

[57] ABSTRACT

A skimmer/separator ladle comprises a handle of an elongated configuration and a bowl of a cup-shaped configuration defining an upper rim. The handle and the bowl are connected together and the handle extends upwardly from the bowl at the upper rim of the bowl. In order to render it possible to carry out any skimming-/separation operation, the bowl has an outwardly protruding tongue arranged at a first rim section of the bowl, which tongue is located below the upper rim of the bowl, and further one or more through-going holes which are provided in the bowl and arranged at a second rim section of the bowl, which one or more through-going holes are located below the upper rim of the bowl and further located above the tongue.

19 Claims, 2 Drawing Sheets

SKIMMER/SEPARATOR LADLE

FIELD OF THE INVENTION

The present invention generally relates to the technique of skimming or separating materials or constituents of foodstuff from a liquid, such as separating solid material from a liquid, e.g. a soup, and the technique of skimming e.g. fat from a liquid such as a sauce or a soup.

Numerous skimmers/separator ladles are known e.g. from French Pat. No. 1.013.301, French Pat. No. 1.574.164, European Pat. No. 0 316 499, German Pat. No. 22 08 318, U.S. Pat. No. 2,853,779, U.S. Pat. No. 4,839,965, and U.S. Pat. No. 5,005,294, to which patents reference is made and which U.S. patents are further incorporated in the present specification by reference. A skimmer/separator ladle is manufactured by the German company Walz & Kieferlee GmbH and sold under the tradename Joul & Jouliette.

Common to the above described skimmer/separator ladles known from the above patents and also known from a brochure describing the above-mentioned ladle sold under the tradename Joul & Jouliette are drawbacks relating to the applicability and functionality of the ladle. Most of the ladles known from the above patents etc. are only adapted and intended to be used for a single separation/skimming operation and are not universally applicable. Those of the ladles known from the above patents and publications which are adapted to be used for more than a single skimming/separation operation are not entirely satisfactory as to their functionality as the ladles in question are not readily usable for multiple purposes. A further drawback relating to numerous of the ladles known from the above patents and publications relate to the process of cleaning the ladle in question, and more precisely relate to a severe drawback as the ladle is not easily cleanable.

A primary object of the present invention is to provide a skimmer/separator ladle which is universally applicable for separating/skimming liquids and/or solids.

A further object of the present invention is to provide a skimmer/separator ladle which is easily cleanable.

A particular advantage of the skimmer/separator ladle according to the present invention relates to a simple geometrical configuration of the ladle still fulfilling the multi-application purpose fulfilled in accordance with the teachings of the present invention.

A particular feature of the present invention relates to the fact that the skimmer/separator ladle according to the present invention relates to the simplicity of the structure solely comprising a handle and a bowl which may be manufactured separately and later on assembled into a single structure, or alternatively cast or punched integrally.

SUMMARY OF THE INVENTION

The above objects, advantages, and features of the present invention and numerous other objects, advantages, and features which will be evident from the below detailed description of a preferred embodiment of the skimmer/separator ladle according to the present invention are obtained in accordance with the teachings of the present invention by a skimmer/separator ladle according to the present invention.

According to a first aspect of the present invention, a skimmer/separator ladle is provided, comprising:

a handle of an elongated configuration, and
a bowl of a cup-shaped configuration defining an upper rim,
said handle and said bowl being connected together, and said handle extending upwardly from said bowl at said upper rim thereof,
said bowl having an outwardly protruding tongue arranged at a first rim section of said bowl and being located below said upper rim of said bowl, and one or more through-going holes provided in said bowl and arranged at a second rim section of said bowl, said one or more through-going holes being located below said upper rim of said bowl and further being located above said tongue.

By providing an outwardly protruding tongue of the bowl and one or more through-going holes in accordance with the teachings of the present invention, a skimmer/separator ladle is provided which, on the one hand, is of a simple structure, i.e. is of a unitary structure comprising a handle and a bowl exclusively and, on the other hand, renders it possible in an easy and reliable manner to carry out any skimming and separation operation involving the skimming of liquid and/or separation of solid material from a liquid, or alternatively separating a liquid from solid material.

According to a second aspect of the present invention, a skimmer/separator ladle is provided, comprising:

a handle of an elongated configuration, and
a bowl of a cup-shaped configuration defining an upper rim,
said handle and said bowl being connected together, and said handle extending upwardly from said bowl at said upper rim thereof,
said bowl having an outwardly protruding tongue arranged at a first rim section of said bowl and being located below said upper rim of said bowl, one or more through-going holes provided in said bowl and arranged at a second rim section of said bowl, said one or more through-going holes being located below said upper rim of said bowl and further being located above said tongue, and a spout arranged at said upper rim of said bowl.

According to a third aspect of the present invention, a skimmer/separator ladle is provided, comprising a handle of an elongated configuration, and
a bowl of a cup-shaped configuration defining an upper rim,
said handle and said bowl being connected together, and said handle extending upwardly from said bowl at said upper rim thereof,
said bowl having an outwardly protruding tongue arranged at a first rim section of said bowl and being located below said upper rim of said bowl, one or more through-going holes provided in said bowl and arranged at a second rim section of said bowl, said one or more through-going holes being located below said upper rim of said bowl and further being located above said tongue, and a spout arranged at said upper rim of said bowl, said spout being located opposite to said handle, and said tongue being located opposite to said one or more holes.

BRIEF DESCRIPTION OF THE DRAWINGS

The invention will now be further described with reference to the drawings, in which.

DETAILED DESCRIPTION OF A PREFERRED EMBODIMENT

Figure 1:
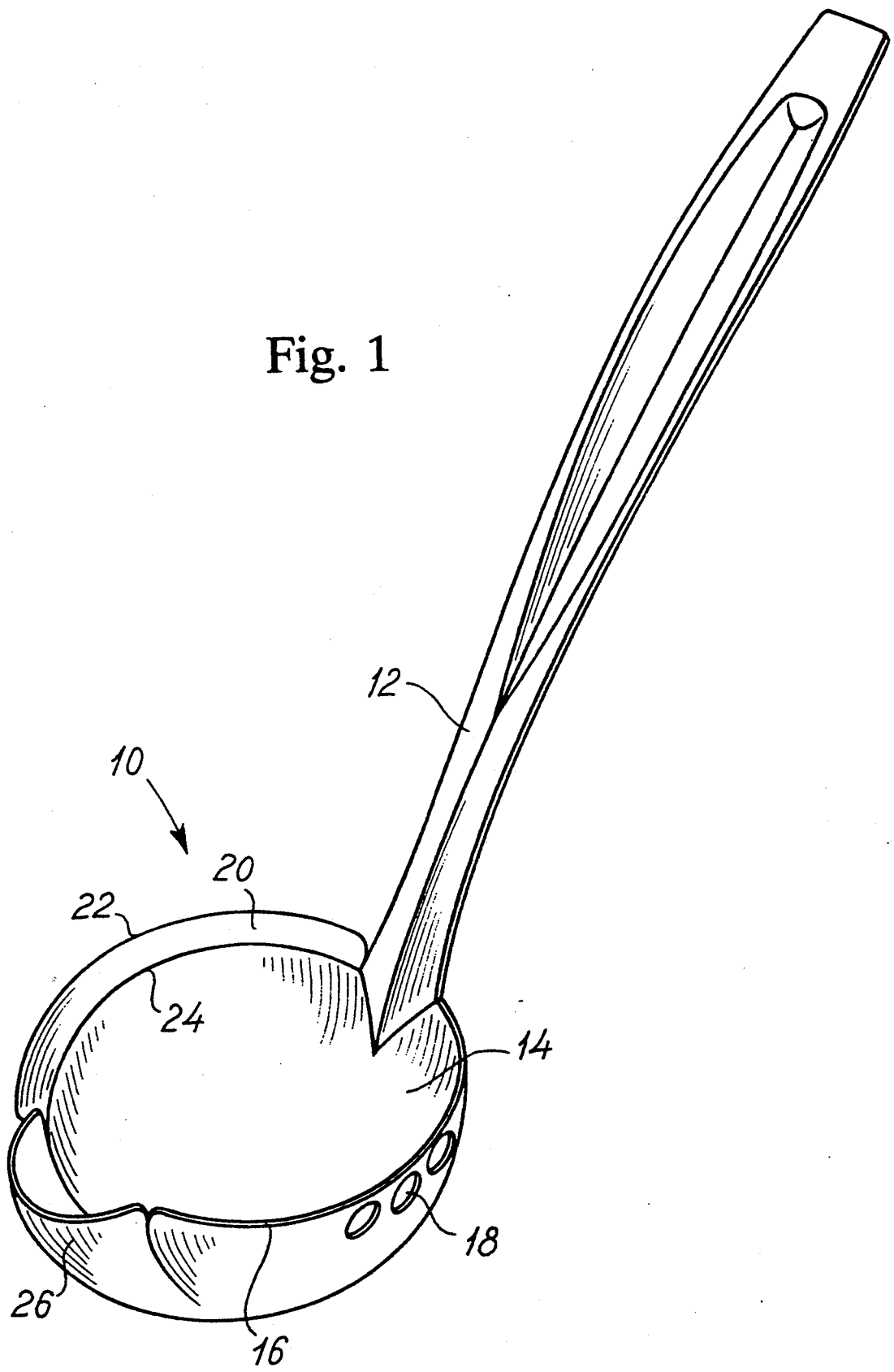
FIG. 1 is a perspective view of a skimmer/separator ladle implemented in accordance with the teachings of the present invention.

In FIG. 1, a presently preferred embodiment of a skimmer/separator ladle according to the present invention is shown, designated the reference numeral 10 in its entirety. The ladle 10 basically comprises two components, viz. a handle 12 and a bowl 14. The handle 12 and the bowl 14 are integrally connected and the handle 12 is of an elongated configuration, extending upwardly from the bowl 14 which constitutes a semi-ovoid container further including three separate elements or components, as will be described in greater details below. The ladle 10 may be constituted by a single integral component which is integrally cast or punched. However, the ladle 10 is preferably composed of two separate components constituting the handle 12 and the bowl. The ladle may be made from any appropriate material which is compatible with foodstuffs such as plastic materials, e.g. ABS, polyethylene, polycarbonate or the like, or alternatively made from metals, such as a non-corrosive metal, e.g. aluminum or stainless steel.

The handle 12 of the ladle 10 may further by of any appropriate configuration, e.g. of a straight or curved configuration or a combination of straight and curved segments. Furthermore, the handle 12 may at its upper free end be provided with a hole or aperture, or alternatively with a hook-like protrusion by means of which the ladle 10 may be positioned or hung on e.g. a nail, screw, suspension bar or the like.

The bowl 14 is of a basically cup-like configuration, preferably of a substantially semi-spherical configuration or a configuration composed of segments of spheres. The bowl 14 defines an upper rim 16 from which the handle 12 extends upwardly and which preferably further defines a single plane constituting a separation plane on the one side of which the bowl 14 is arranged and on the opposite side of which the handle 12 is arranged. In the normal and intentional orientation of the ladle, when the ladle is used for its intentional purposes, as will be described in greater details below, the bowl 14 is arranged below the above described separation plane, whereas the handle 12 extends upwardly from and above the above described separation plane. The rim 16 further defines or describes a segment of a circle or a combination of circular segments. Alternatively, the rim 16 may be composed of e.g. linear, oval or other geometrical segments. Below the rim 16, the bowl is provided with a plurality of through-going holes, in the presently preferred embodiment shown in FIG. 1, a total of three holes are provided, one of which is designated the reference numeral 18 and which constitutes the central hole among the three through-going holes. The central hole 18 is positioned approximately 90° along the rim 16 from the handle 12. The hole or holes may be of any appropriate configuration such as circular, oval or triangular configuration, or combinations thereof.

Opposite the through-going hole or holes 18, the bowl 14 is provided with a turned-in, outwardly protruding tongue 20 which may be of a plane configuration, a sloping or an overall U-shaped configuration. The turned-in, outwardly protruding tongue 20 defines an outer rim 22 and an inner rim 24 which are arranged below the above described separation plane, i.e. arranged at a height below the rim 16 of the bowl 14. Provided the turned-in, outwardly protruding tongue 20 is of a plane configuration, the inner and outer rim 22 and 24, respectively, may be arranged at the same height below the rim 16, however, provided the turned-in, outwardly protruding tongue 20 is of a plane configuration, the outer rim 22 is preferably arranged at a height above the inner rim 24. Provided the turned-in, outwardly protruding tongue 20 is of a U-shaped configuration, the tongue is preferably arranged as a downwardly curved and inwardly sloping tongue, i.e. a tongue which has its outer rim 22 positioned above the remaining part of the tongue and also above the inner rim 24, however, still arranged below the rim 16 relative to the above described separation plane.

The turned-in, outwardly protruding tongue 20 preferably extends along a segment of the bowl 14 which segment is of identical or substantially identical size as the segment along which the rim 16 extends.

Figure 3:
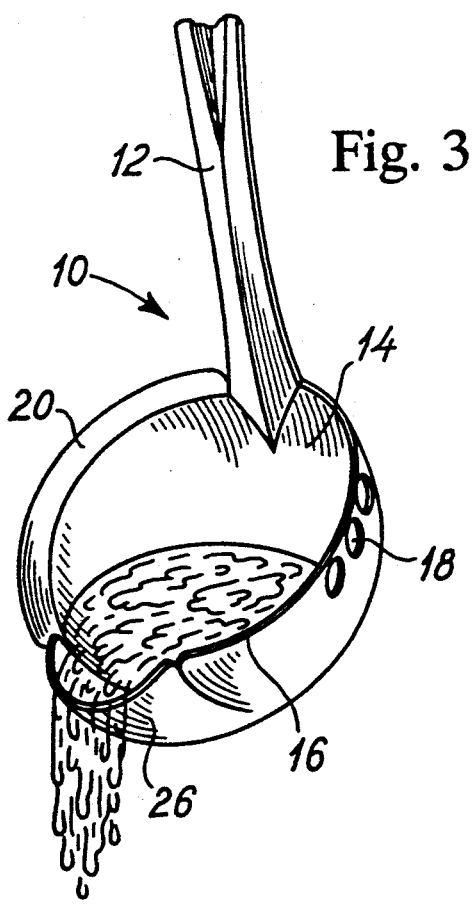

Opposite the handle 12, a spout 26 is provided which serves the purpose of allowing that any liquid or solid material contained within the bowl 14 may be poured from the bowl as is disclosed in FIG. 3.

Although the handle 12, the turned-in, outwardly protruding tongue 20, the spout 26, and the holes 18 are preferably positioned angularly spaced apart at 90°, as is evident from FIG. 1, the angular spacing may be altered and further the sequence of the elements may be altered as e.g. the spout 26 may be positioned at a position 90° from the handle 12, e.g. at the position at which the holes 18 are shown in FIG. 1, and the holes 18 may be positioned on both sides of the spout 26. Alternatively, e.g. the holes and the spout 26 may simply be shifted relative to one another.

Figure 2:
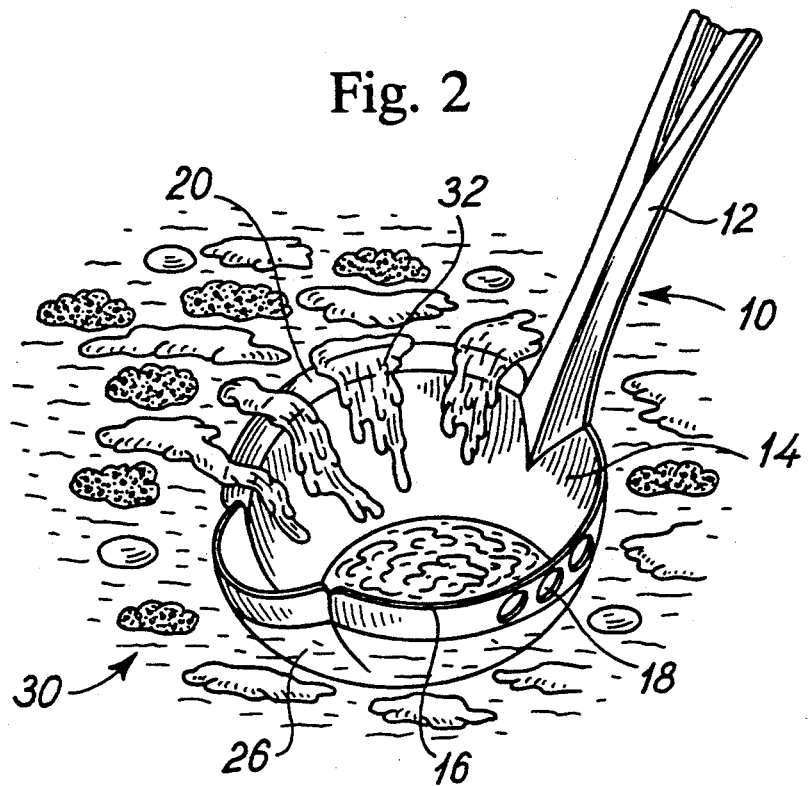
FIGS. 2, 3, and 4 are perspective, sectional, and schematical views illustrating various applications of the skimmer/separator ladle shown in FIG. 1.
Figure 4:
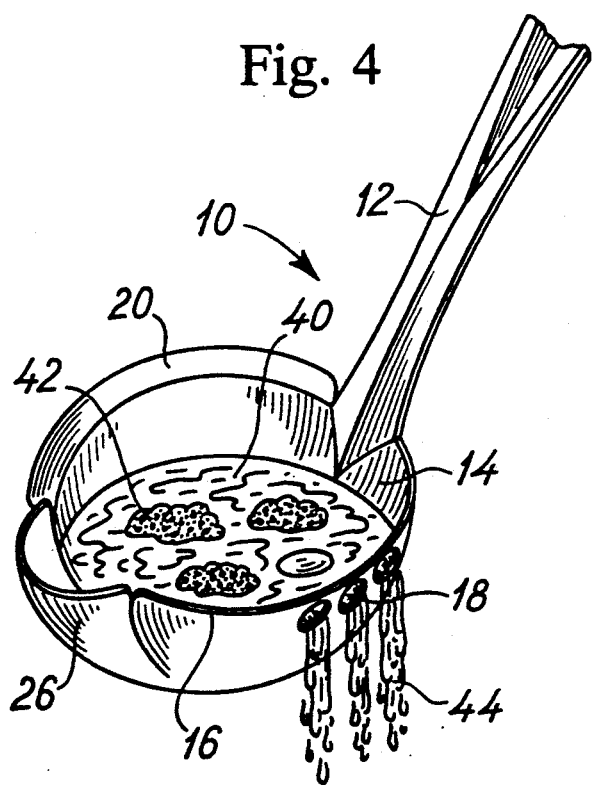

In FIGS. 2-4, alternative applications of the ladle 10 are shown. In FIG. 2, the skimmer/separator ladle 10 is used to skim e.g. fat from a liquid, e.g. a soup, as the ladle 10 is introduced into the soup and submerged into the soup to a certain level as the turned-in, outwardly protruding tongue 20 is positioned below the fat-containing surface layer which consequently is drained into the inner of the bowl 14 as indicated at 32. Due to the turned-in, outwardly protruding tongue 20, a highly accurate and precise skimming may be carried out in which operation the fat-containing surface layer is completely removed from the soup 30 without unintentionally removing alternative material or materials from the soup. During the skimming operation, the holes 18 may also be used for draining the fat-containing surface layer into the inner of the bowl 14, however, a more precise and accurate skimming operation is carried out, provided the turned-in, outwardly protruding tongue 20 is solely used for the skimming operation.

As mentioned above, the operation of pouring material contained within the bowl 14 of the ladle 10 is preferably carried out by employing the spout 26. Thus, the fat skimmed from the soup 30 shown in FIG. 2 may be poured from the interior of the bowl 14 as shown in FIG. 3.

The ladle 10 may alternatively, in accordance with the application illustrated in FIG. 4, be used for separating liquid from solid materials or alternatively for separating solid materials from a liquid, as a solid material-containing liquid is simply introduced into or received within the bowl 14 of the ladle 10, which liquid is designated the reference numeral 40, and which solid materials are illustrated at 42. By tilting the skimmer/separator ladle 10, the liquid is poured through the holes 18 as illustrated at 44, whereas the larger solid materials 42 are retained within the interior of the bowl 14 of the ladle 10 as the liquid is drained from the bowl.

EXAMPLE

A prototype implementation of the above described, presently preferred implementation of the skimmer/separator ladle according to the present invention shown in FIG. 1 wad made from stainless steel. The handle 12 had an overall length of 226 mm above the rim 16 of the bowl 14 and defined an angle of 55° relative to the imaginary separation plane defined by the rim 16 of the bowl 14. The handle 12 had a maximum width of 20 mm and a minimum width of 14 mm at its upper free end. The height of the bowl 14, i.e. the vertical dimension from the imaginary separation plane defined by the rim 16 to the lowermost point of the bowl 14 was 37 mm. The bowl 14 was of a configuration composed of four segments of spheres of radii 84 mm, 80 mm, 80 mm, and 90 mm. The spout 26 defined at its upper rim a circle of a radius of 42 mm and protruded 15 mm from the remaining part of the bowl 14. The tongue defined a width of 12 mm and was sloping from its outer rim 22 to its inner rim 24 at an angle of approximately 30°. The holes 18 were circular holes of a diameter of 6 mm which had their centers positioned 4 mm below the upper rim 16 of the bowl 14.

Although the present invention has been described with reference to a presently preferred embodiment shown in the drawings, numerous modifications and variations are deduceable in accordance with the teachings of the present invention as defined in the appending claims and are obvious to a person having ordinary skill in the art. Thus, apart from the above described alternative embodiments, the turned-in, outwardly protruding tongue may be divided into a plurality of segments which may be further separated by e.g. through-going holes similar to the through-going holes described above. In the above described, presently preferred embodiment, a total of three holes are provided. The number of holes are, obviously, arbitrary and may vary from a single hole to a fairly large number of holes, e.g. twenty holes. Furthermore, as mentioned above, the handle, the tongue, the spout, and the holes may be shifted relative to one another and, furthermore, the ladle may be provided as a left-hand ladle and a right-hand ladle in which the holes 18 and the tongue 20 are shifted relative to one another. As stated above, the handle is preferably of an elongated configuration. Also, as indicated above, the handle may be of a straight or curved configuration. Alternatively, the handle may be a fairly short handle and may vary in shape and size relative to the bowl for complying with specific structural or technical requirements. Furthermore, each of the elements of the skimmer/separator ladle may be substituted by a similar element fulfilling the same function, or substantially the same function as the element in question. Thus, the outwardly protruding tongue of the skimmer/separator ladle may be substituted by any appropriate element fulfilling the same or substantially the same function as the outwardly protruding tongue, e.g. be substituted by an inwardly protruding tongue or the like.

I claim:

1. A skimmer/separator ladle comprising:
a handle of an elongated configuration, and
a bowl of a cup-shaped configuration defining an upper rim,
said handle and said bowl being connected together, and said handle extending upwardly from said bowl at said upper rim thereof,
said bowl having an outwardly protruding tongue arranged at a first rim section of said bowl and being located below said upper rim of said bowl, and one or more through-going holes provided in said bowl and arranged at a second rim section of said bowl, said one or more through-going holes being located below said upper rim of said bowl and further being located above said tongue.

2. The ladle according to claim 1, said tongue constituting a turned-in part of said bowl and defining an outer rim and an inner rim.

3. The ladle according to claim 2, said tongue being of a substantially plane configuration.

4. The ladle according to claim 2, said tongue being of a substantially downwardly curved, U-shaped configuration.

5. The ladle according to claim 3, said tongue sloping from said outer rim toward said inner rim.

6. The ladle according to claim 3, said tongue having its inner and outer rims located at substantially identical height relative to said upper rim of said bowl.

7. The ladle according to claim 1, comprising a plurality of outwardly protruding tongues.

8. The ladle according to claim 1, comprising a single through-going hole.

9. The ladle according to claim 1, comprising more than one hole, preferably 3 holes.

10. A skimmer/separator ladle comprising:
a handle of an elongated configuration, and
a bowl of a cup-shaped configuration defining an upper rim,
said handle and said bowl being connected together, and said handle extending upwardly from said bowl at said upper rim thereof,
said bowl having an outwardly protruding tongue arranged at a first rim section of said bowl and being located below said upper rim of said bowl, one or more through-going holes provided in said bowl and arranged at a second rim section of said bowl, said one or more through-going holes being located below said upper rim of said bowl and further being located above said tongue, and a spout arranged at said upper rim of said bowl.

11. The ladle according to claim 10, said tongue constituting a turned-in part of said bowl and defining an outer rim and an inner rim.

12. The ladle according to claim 11, said tongue being of a substantially plane configuration.

13. The ladle according to claim 11, said tongue being of a substantially downwardly curved, U-shaped configuration.

14. The ladle according to claim 12, said tongue sloping from said outer rim toward said inner rim.

15. The ladle according to claim 12, said tongue having its inner and outer rims located at substantially identical height relative to said upper rim of said bowl.

16. The ladle according to claim 1, comprising a plurality of outwardly protruding tongues.

17. The ladle according to claim 1, comprising a single through-going hole.

18. The ladle according to claim 1, comprising more than one hole, preferably 3 holes.

19. A skimmer/separator ladle comprising:

a handle of an elongated configuration, and
a bowl of a cup-shaped configuration defining an upper rim,
said handle and said bowl being connected together, and said handle extending upwardly from said bowl at said upper rim thereof,
said bowl having an outwardly protruding tongue arranged at a first rim section of said bowl and being located below said upper rim of said bowl, one or more through-going holes provided in said bowl and arranged at a second rim section of said bowl, said one or more through-going holes being located below said upper rim of said bowl and further being located above said tongue, and a spout arranged at said upper rim of said bowl, said spout being located opposite to said handle, and said tongue being located opposite to said one or more holes.

* * * * *

UNITED STATES PATENT AND TRADEMARK OFFICE
CERTIFICATE OF CORRECTION

PATENT NO. : 5,199,349            Page 1 of 4

DATED : April 6, 1993

INVENTOR(S) : Hans Hansen

Figure 5:
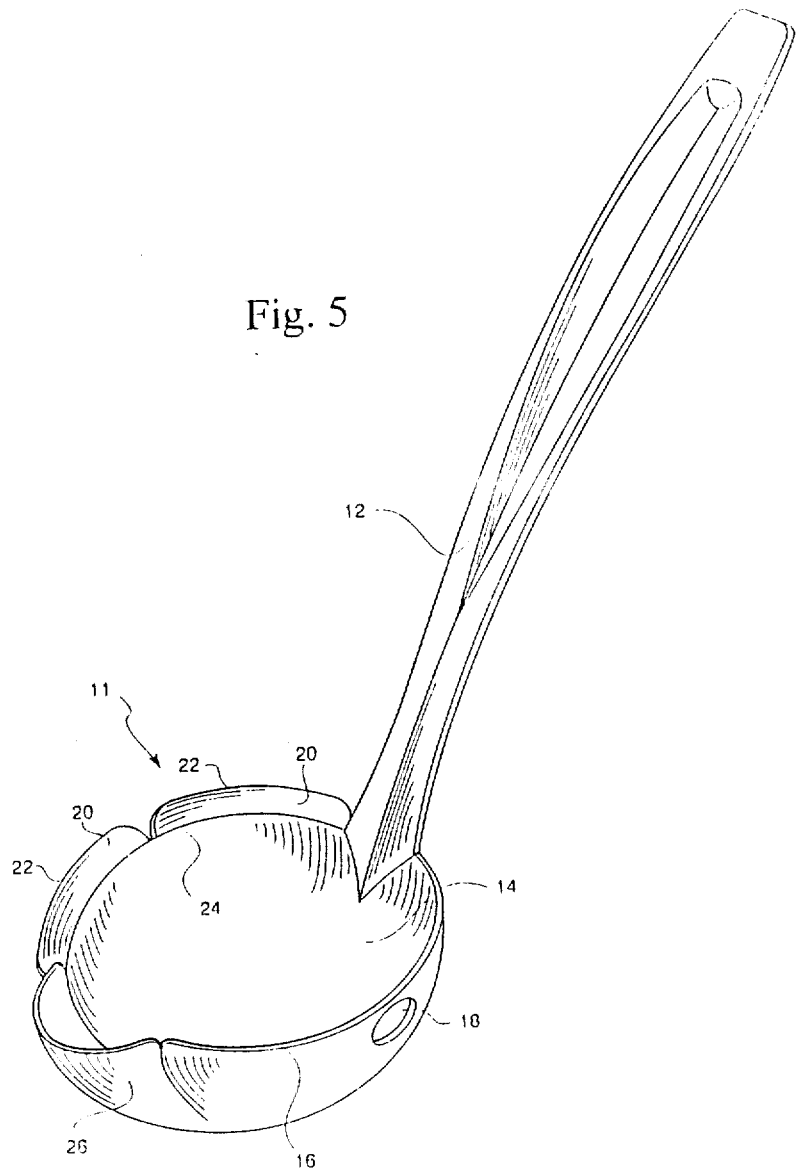

It is certified that error appears in the above-indentified patent and that said Letters Patent is hereby corrected as shown below:

The Drawing Sheet, consisting of Figure 5, should be added as shown on the attached page.

UNITED STATES PATENT AND TRADEMARK OFFICE
CERTIFICATE OF CORRECTION

PATENT NO. : 5,199,349
DATED : April 6, 1993
INVENTOR(S) : Hans Hansen

Page 3 of 4

It is certified that error appears in the above-indentified patent and that said Letters Patent is hereby corrected as shown below:

Column 3, line 4 s.b. --FIG. 5 is a perspective view of a skimmer/separator ladle similar to FIG.1 but illustrating a plurality of outwardly protruding tongues and a single through-going hole.--.

Column 3, line 27 "by" s.b. --be--.

Column 3, line 59 after "hole" insert --(see Fig. 5, ladle 11)--.

Column 5, line 10 "wad" s.b. --was--.

Column 5, line 38 after "plurality of segments" insert --(see Fig. 5, ladle 11)--.

Column 5, line 44 after "a single hole" insert --(see Fig. 5, ladle 11)--.

Column 6, line 62 "claim 1" s.b. --claim 10--.

Column 6, line 64 "claim 1" s.b. --claim 10--.

UNITED STATES PATENT AND TRADEMARK OFFICE
CERTIFICATE OF CORRECTION

PATENT NO. : 5,199,349

DATED : April 6, 1993

INVENTOR(S) : Han Hansen

It is certified that error appears in the above-indentified patent and that said Letters Patent is hereby corrected as shown below:

Column 6, line 66 "claim 1" s.b. --claim 10--.

Signed and Sealed this

Fifth Day of July, 1994

Attest:

BRUCE LEHMAN

Attesting Officer     Commissioner of Patents and Trademarks